US009803691B2

(12) United States Patent
Mongeau

(10) Patent No.: US 9,803,691 B2
(45) Date of Patent: Oct. 31, 2017

(54) ROTATING ELECTRICAL MACHINE HAVING IMPROVED BEARING LUBRICATION AND ASSOCIATED METHODS

(71) Applicant: Vestas Wind Systems A/S, Aarhus N. (DK)

(72) Inventor: Peter Mongeau, Center Conway, MA (US)

(73) Assignee: Vestas Wind Systems A/S, Aarhus N. (DK)

( * ) Notice: Subject to any disclaimer, the term of this patent is extended or adjusted under 35 U.S.C. 154(b) by 315 days.

(21) Appl. No.: 14/651,358

(22) PCT Filed: Dec. 14, 2012

(86) PCT No.: PCT/DK2012/050465
§ 371 (c)(1),
(2) Date: Jun. 11, 2015

(87) PCT Pub. No.: WO2014/090251
PCT Pub. Date: Jun. 19, 2014

(65) Prior Publication Data
US 2015/0330452 A1 Nov. 19, 2015

(51) Int. Cl.
*H02K 5/16* (2006.01)
*F16C 33/66* (2006.01)
(Continued)

(52) U.S. Cl.
CPC ............ *F16C 33/6659* (2013.01); *F03D 9/25* (2016.05); *F16C 33/6685* (2013.01);
(Continued)

(58) Field of Classification Search
CPC .... F03D 9/25; F16C 2360/31; F16C 2380/26; F16C 33/6659–33/6685;
(Continued)

(56) References Cited

U.S. PATENT DOCUMENTS

| | | | | |
|---|---|---|---|---|
| 2,635,198 A | * | 4/1953 | Wieseman | H02K 5/1732 310/157 |
| 4,429,924 A | * | 2/1984 | Franz | H02K 5/1732 123/196 R |
| 2003/0189382 A1 | * | 10/2003 | Tornquist | F16C 25/08 310/90 |

FOREIGN PATENT DOCUMENTS

| | | |
|---|---|---|
| DE | 3135901 A1 | 3/1983 |
| FR | 2320456 A1 | 3/1977 |
| JP | S60144125 A | 7/1985 |

OTHER PUBLICATIONS

European Patent Office, International Search Report and Written Opinion issued in International Application No. PCT/DK2012/050465 dated Oct. 15, 2013.

\* cited by examiner

*Primary Examiner* — Ramon M Barrera
(74) *Attorney, Agent, or Firm* — Wood Herron & Evans LLP

(57) ABSTRACT

A rotating electrical machine includes an outer housing; a drive shaft rotatably mounted within the outer housing; a bearing supporting the drive shaft relative to the outer housing, wherein the outer housing includes a support surface confronting the bearing and the bearing includes a bearing surface confronting the support surface, and further wherein a region defined between the support surface and the bearing surface has a lubrication layer; and a lubrication flow path configured to direct a lubricant to the bearing, wherein the lubrication flow path is in fluid communication with the region between the support surface and the bearing surface so as to replenish the lubrication layer. A method of lubricating a bearing for a rotating electrical machine is also disclosed. The rotating electrical machine may be a generator for a wind turbine.

18 Claims, 6 Drawing Sheets

(51) Int. Cl.
*F16C 33/78* (2006.01)
*H02K 5/173* (2006.01)
*H02K 7/18* (2006.01)
*F03D 9/25* (2016.01)

(52) U.S. Cl.
CPC ............ *F16C 33/78* (2013.01); *H02K 5/161* (2013.01); *H02K 5/1732* (2013.01); *H02K 7/1838* (2013.01); *F16C 2360/31* (2013.01); *F16C 2380/26* (2013.01); *Y02E 10/725* (2013.01)

(58) Field of Classification Search
CPC .... H02K 5/16–15/1737; H02K 7/183–7/1838; Y02E 10/725
USPC .......................................................... 310/90
See application file for complete search history.

ROTATING ELECTRICAL MACHINE HAVING IMPROVED BEARING LUBRICATION AND ASSOCIATED METHODS

TECHNICAL FIELD

The invention relates generally to a rotating electrical machine, such as a generator for wind turbine, having improved lubrication to a bearing of the electrical machine, and a method for operating a rotating electrical machine so as to have improved bearing lubrication.

BACKGROUND

Wind turbines are used to produce electrical energy using a renewable resource and without combusting a fossil fuel. Generally, a wind turbine converts kinetic energy from the wind into mechanical energy and then subsequently converts the mechanical energy into electrical power. A horizontal-axis wind turbine includes a tower, a nacelle located at the apex of the tower, and a rotor that is supported in the nacelle. The rotor is coupled with a generator for converting the kinetic energy of the blades to electrical energy.

Generators for wind turbines are relatively large, heavy rotating electrical machines having an outer housing, a drive shaft rotatably mounted within the outer housing, and a stator assembly and rotor assembly also positioned within the outer housing. The outer housing may include a generally cylindrical outer side wall that is closed off at each end with an end shield. The drive shaft is operably coupled to the wind turbine rotor, either directly or through, for example, a gear box, such that rotation of the rotor causes a rotation of the generator drive shaft. In conventional generator constructions, the stator assembly is coupled to the outer housing so as to be stationary, and the rotor assembly is operatively coupled to the drive shaft so as to be rotated with rotation of the drive shaft. Relative rotation between the stator and rotor assemblies produces electricity.

The drive shaft is supported in the generator housing by a pair of bearings, typically at respective ends of the generator and positioned adjacent the end shields. The bearings are configured to limit the movement of the drive shaft (and thus rotor assembly) against axial thrust, radial displacement, and tilt (e.g., 5 of the 6 degrees of freedom). In essence, the bearings constrain the drive shaft to a single degree of freedom, i.e., rotation, which they strive to provide without significant losses or overheating. One of the bearings is typically axially fixed to the housing so as to limit movement against axial loading. This is referred to as a fixed bearing. The other bearing, however, is not axially fixed but is permitted a limited amount of axial displacement relative to the housing. This bearing is referred to as a floating bearing and is provided so as to prevent the generator's moving parts (e.g., drive shaft) from becoming over-constrained by the generator's stationary support system for those moving parts (e.g., generator housing).

In this regard and by way of example, the moving and stationary parts of a generator typically operate at different temperatures and are made of different materials having different thermal expansion coefficients. Accordingly, the moving and stationary parts may be subject to different amounts of thermal expansion/contraction. If the generator housing or other associated supports over-constrain the drive shaft, such as by axially fixing both bearings, then the thermal expansions/contractions of the generator become restricted, resulting in large axial, radial and tilt forces being imposed on the bearings. This, in turn, leads to excessive vibrations, overheating, and ultimately, premature bearing failure, thus prompting frequent and costly replacement. As noted above, to avoid over-constraining the drive shaft, one of the bearings is configured as a floating bearing such that, for example, the effects of thermal expansions/contractions may be readily accommodated via a limited amount of axial movement of the floating bearing. Configuring one of the bearings as a floating bearing extends the working life of the bearings, thereby reducing maintenance costs and increasing production time.

While the floating bearing works for its intended purpose, there are some drawbacks to the implementation of the floating bearing in current generators for wind turbines. In this regard, the floating bearing may be configured as a rolling element bearing having, for example, an inner race coupled to and rotatable with the drive shaft, an outer race coupled to the stationary housing in a manner that permits axial movement, and rolling elements, such as ball bearings or rollers, disposed between the inner and outer races. More particularly, the floating bearing is positioned adjacent an end shield such that there is a slight interference fit between the outer periphery of the outer race and the inner periphery of the end shield. This region between the outer periphery of the outer race and the inner periphery of the end shield is critical in floating bearing designs and may be sensitive to tolerances and clearances. For example, should the clearances be too tight, the bearing may become locked as a result of, for example, thermal expansions/contractions. On the other hand, excessive clearances may allow the bearing to tilt or cock in a locked position or subject the generator to excessive vibrations.

Upon assembly of the generator, a layer of lubricant is generally disposed in the critical region between the outer periphery of the outer race and the inner periphery of the end shield. This lubrication layer facilitates the axial movement of the floating bearing during operation of the generator, as discussed above. With extended use of the generator, however, this lubrication layer may decompose, be scraped off, or weep out of the space between the bearing and the end shield. Unfortunately, current generator designs provide no mechanism or provision for replenishing the lubrication layer in this region. Thus, with the loss or reduction of the lubrication layer, the relative movement between the bearing and the end shield may become restricted. In some circumstances, the floating bearing may become jammed, cocked or otherwise locked such that it loses its ability to move axially. In this case, the floating bearing operates like a fixed bearing. Since both bearings are now axially fixed, the drive shaft may become over-constrained by the generator housing, potentially resulting in premature failure of one or both bearings.

Accordingly, there is a need for a generator for a wind turbine that provides improved bearing lubrication. More particularly, there is a need for a generator that provides for replenishing the lubrication layer in the region between the floating bearing and the housing, thereby providing continued axial displacement of the floating bearing during use. There is also a need for a wind turbine having a generator with improved bearing lubrication and a method of operating a generator for a wind turbine so as to have improved bearing lubrication.

SUMMARY

According to one embodiment, a rotating electrical machine includes an outer housing; a drive shaft rotatably mounted within the outer housing; a bearing supporting the drive shaft relative to the outer housing, wherein the outer housing includes a support surface confronting the bearing and the bearing includes a bearing surface confronting the support surface, and further wherein a region defined between the support surface and the bearing surface has a lubrication layer; and a lubrication flow path configured to direct a lubricant to the bearing, wherein the lubrication flow path is in fluid communication with the region between the support surface and the bearing surface so as to replenish the lubrication layer.

In one embodiment, the lubrication flow path includes an inlet for receiving lubricant and an outlet for supplying lubricant to an interior of the bearing, wherein at least a portion of the region between the support surface and the bearing surface forms a portion of the lubrication flow path between the inlet and the outlet. In an embodiment, the bearing may form part of a floating bearing assembly wherein at least a portion of the bearing, that includes the bearing surface, is permitted to be axially displaced relative to the outer housing. The lubrication flow path may include an annular groove formed in the support surface and configured to distribute lubricant about a periphery of the bearing surface. In addition, the lubrication flow path may include one or more flow channels formed in the support surface, wherein the one or more flow channels communicates with the groove and extends away therefrom.

A seal member may be disposed in the region between the support surface and the bearing surface for urging lubricant in a preferred direction. In this regard, an annular seal groove may be formed in the support surface and an O-ring seated therein which forms a fluid tight seal with the bearing surface. In an exemplary embodiment, the bearing may be a rolling element bearing having an inner race, an outer race, and a plurality of rolling elements disposed therebetween. The outer surface of the outer race may define the bearing surface. Furthermore, the outer housing may include an end shield that substantially surrounds the bearing and defines the support surface.

In an exemplary embodiment, the rotating electrical machine may be configured as a generator having a stator assembly and a rotor assembly positioned within the outer housing and configured to produce electricity. More specifically, in one embodiment a wind turbine includes a tower, a nacelle disposed adjacent a top of the tower, a rotor including a hub and at least one wind turbine blade extending from the hub, and a generator disposed in the nacelle. The generator includes an outer housing configured to contain a stator assembly and a rotor assembly for producing electricity, and a drive shaft rotatably mounted within the outer housing and configured to drive the generator so as to produce electricity. The generator further includes a bearing supporting the drive shaft relative to the outer housing, wherein the outer housing includes a support surface confronting the bearing and the bearing includes a bearing surface confronting the support surface, and further wherein a region defined between the support surface and the bearing surface has a lubrication layer. The generator includes a lubrication flow path configured to direct a lubricant to the bearing, wherein the lubrication flow path is in fluid communication with the region between the support surface and the bearing surface so as to replenish the lubrication layer.

A method of lubricating a bearing for a rotating electrical machine is disclosed. The rotating electrical machine supports a drive shaft relative to an outer housing, the outer housing including a support surface confronting the bearing and the bearing including a bearing surface confronting the support surface, and a region being defined between the support surface and the bearing surface. The method includes operating the rotating electrical machine and supplying lubricant to the region between the support surface and the bearing surface during operation of the rotating electrical machine so as to replenish a lubrication layer disposed in the region. The method may further include supplying lubricant to an interior of the bearing.

In one embodiment, supplying lubricant to the region between the support surface and the bearing surface and supplying lubricant to the interior of the bearing further comprises directing lubricant along a flow path in fluid communication with the interior of the bearing, wherein at least a portion of the flow path includes the region between the support surface and the bearing surface. Additionally, supplying lubricant to the region between the support surface and the bearing surface further comprises distributing the lubricant about the periphery of the bearing. In one embodiment, the rotating electrical machine includes a lubrication system for supplying lubricant. In this embodiment, supplying lubricant to the region between the support surface and the bearing surface and supplying lubricant to the interior of the bearing are performed by the same lubrication system. The method may further include passing lubricant through the interior of the bearing, and draining the used lubricant from the rotating electrical machine. In one embodiment, the method is implemented with the rotating electrical machine configured as a generator. More specifically, the method is implemented when the generator is for use in a wind turbine.

BRIEF DESCRIPTION OF THE DRAWINGS

The accompanying drawings, which are incorporated in and constitute a part of this specification, illustrate an embodiment of the invention and, together with a general description of the invention given above, and the detailed description given below, serve to explain the invention.

DETAILED DESCRIPTION

Aspects of the present invention are directed to the lubrication of a bearing of a rotating electrical machine, and more particularly, to a floating bearing of the rotating electrical machine. For purposes of illustration and understanding, various aspects of the present invention are shown and described herein in the context of a generator for a wind turbine. It should be understood that a generator for a wind turbine is but one exemplary embodiment of a rotating electrical machine which may benefit from aspects of the invention. Indeed, there may be other types of generators, or other types of rotating electrical machines, such as motors, for example, which may also benefit from aspects of the invention. Accordingly, aspects of the invention are not limited to implementation in a generator for a wind turbine, but may be implemented in a broader class of rotating electrical machines having a floating bearing for facilitating relative movement between moving and stationary portions of the electrical machine.

Figure 1:
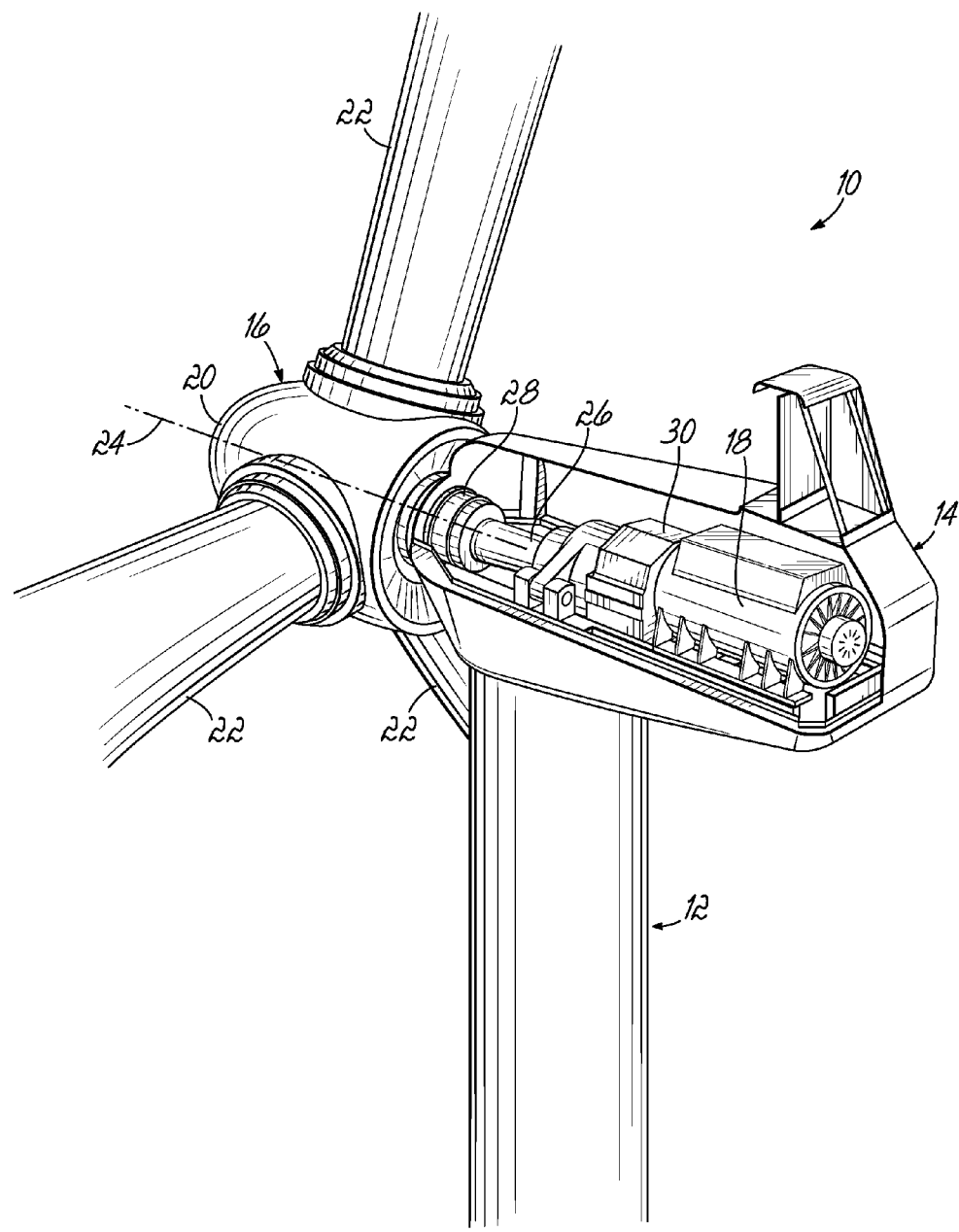
FIG. 1 is a partially torn away perspective view of a wind turbine having a generator in accordance with an embodiment of the invention.

With reference to FIG. 1 and in accordance with an embodiment of the invention, a wind turbine 10 includes a tower 12, a nacelle 14 disposed at the apex of the tower 12, and a rotor 16 operatively coupled to a generator 18 housed inside the nacelle 14. In addition to the generator 18, the nacelle 14 houses miscellaneous components required for converting wind energy into electrical energy and various components needed to operate, control, and optimize the performance of the wind turbine 10. The tower 12 supports the load presented by the nacelle 14, the rotor 16, the generator 18 and other components of the wind turbine 10 that are housed inside the nacelle 14. The tower 12 of the wind turbine 10 also operates to elevate the nacelle 14 and rotor 16 to a height above ground level or sea level, as may be the case, at which faster moving air currents of lower turbulence are typically found.

The rotor 16 of the wind turbine 10, which is represented as a horizontal-axis wind turbine, serves as the prime mover for the electromechanical system. Wind exceeding a minimum level will activate the rotor 16 and cause rotation in a direction substantially perpendicular to the wind direction. The rotor 16 of wind turbine 10 includes a central hub 20 and at least one blade 22 that projects outwardly from the central hub 20. In the representative embodiment, the rotor 16 includes three blades 22 at locations circumferentially distributed thereabout, but the number may vary. The blades 22 are configured to interact with the passing air flow to produce lift that causes the central hub 20 to spin about a longitudinal axis 24. The design and construction of the blades 22 are familiar to a person having ordinary skill in the art and will not be further described. For example, each of the blades 22 may be connected to the central hub 20 through a pitch mechanism (not shown) that allows the blades to pitch under control of a pitch controller.

The rotor 16 may be mounted on an end of a main drive shaft 26 that extends into the nacelle 14 and is rotatably supported therein by a main bearing assembly 28 coupled to the framework of the nacelle 14. The main drive shaft 26 is operatively coupled to one or more gear stages, which may be in the form of a gear box 30, to produce a more suitable mechanical input to the generator 18 located in the nacelle 14. The gear box 30 relies on various gear arrangements to provide speed and torque conversions from the rotation of the rotor 16 and main drive shaft 26 to the rotation of a secondary drive shaft 32 (FIG. 2; "high speed shaft") that operates as an input to the generator 18. By way of example, the gear box 30 may transform the relatively low rotational speed of the main drive shaft 26 to a relatively high rotational speed of the secondary drive shaft 32 which is mechanically coupled to the generator 18. Although the wind turbine 10 has been described as an indirect drive system including one or more gear stages, it should be realized that the wind turbine may also be configured as a direct drive system without gear stages and remain within the scope of the invention.

The wind turbine 10 may be included among a collection of similar wind turbines belonging to a wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical power is supplied from the generator 18 to the power grid as known to a person having ordinary skill in the art.

Figure 2:
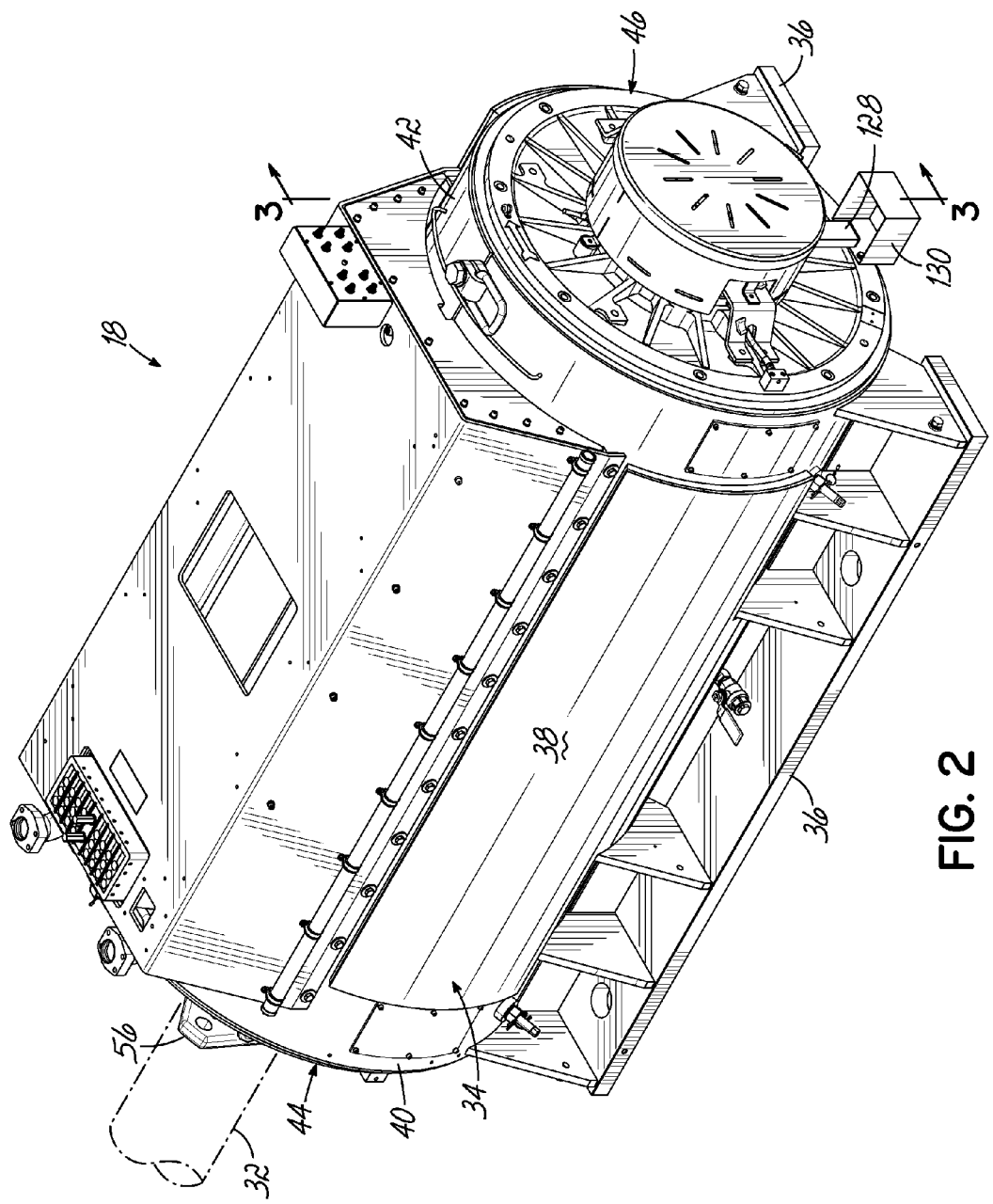
FIG. 2 is a perspective view of a generator in accordance with an embodiment of the invention.
Figure 3:
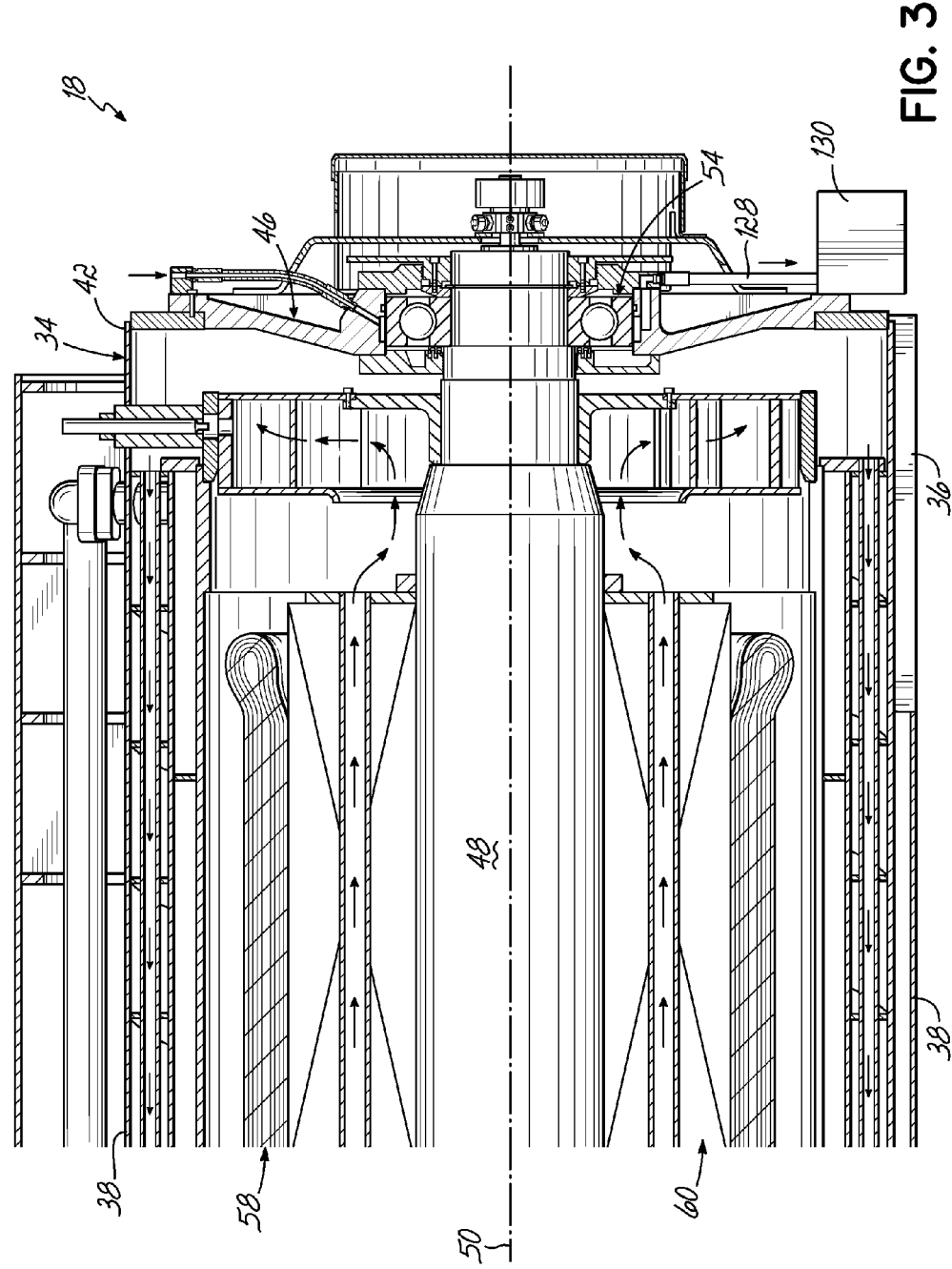
FIG. 3 is a partial cross-sectional view of the generator shown in FIG. 2.

In reference to FIGS. 2 and 3, generator 18 includes an outer housing 34 configured to contain and shield the various internal components of the generator 18, and one or more supports 36 for supporting the generator 18 and for securing the generator 18 to the nacelle 14, such as to a floor or support frame of the nacelle 14. Because the generator 18 is a rotating electrical machine, the outer housing 34 may include a generally cylindrical side wall 38 extending between a first front end 40 and a second rear end 42. The front and rear ends 40, 42 may be closed off by corresponding end shields 44, 46 which form part of the outer housing 34. The cylindrical configuration of the outer housing 34 is merely exemplary, however, and other shapes and configurations are possible for the outer housing 34. In any event, a generator drive shaft 48 may be disposed within the outer housing 34 and configured to be rotatable relative to the outer housing 34 about a central axis 50 defined thereby. In this regard, the drive shaft 48 may be supported relative to the outer housing 34 by one or more bearing assemblies.

More particularly, in an exemplary embodiment, the drive shaft 48 may be supported relative to the outer housing 34 by a first bearing assembly adjacent the front end 40 of the generator 18 (not shown) and a second bearing assembly 54 adjacent the rear end 42 of the generator 18. As will be discussed in more detail below, the bearing assemblies cooperate with the end shields 44, 46 to support the drive shaft 48 within the outer housing 34. A portion of the generator drive shaft 48 may extend from the front end 40 of the outer housing 34 where it may be coupled to the secondary drive shaft 32 on the output side of the gear box 30 via a suitable mechanical coupling 56, as is generally known in the art. Accordingly, the generator drive shaft 48 rotates with the rotation of the secondary drive shaft 32, which is driven by rotor 16.

The generator 18 includes a stator assembly 58 and a rotor assembly 60, both shown schematically in FIG. 3, concentrically disposed relative to each other within the outer housing 34. In an exemplary embodiment, the stator assembly 58 is generally fixed and stationary while the rotor assembly 60 is configured to rotate relative to the stator assembly 58. Thus, in the exemplary embodiment, the stator assembly 58 may be operatively coupled to the outer housing 34 and the rotor assembly 60 may be operatively coupled to the generator drive shaft 48, wherein the stator assembly 58 is disposed radially outward of the rotor assembly 60. The stator assembly 58 generally includes a plurality of coils (shown schematically). As the coils, and in particular their construction and arrangement in the stator assembly 58 are generally known to those of ordinary skill in the art, no further discussion is deemed necessary in order to understand the various aspects of the invention.

The rotor assembly 60 generally includes a plurality of magnetic elements for generating a magnetic field which induces a current in the coils carried by the stator assembly 58. In one embodiment, it is contemplated that permanent magnets may be carried by the rotor assembly 60. In another embodiment, however, it is contemplated that electromagnets may be carried by the rotor assembly 60. As the magnets, and in particular their construction and arrangement within the rotor assembly 60 are generally known to those of ordinary skill in the art, no further discussion is deemed necessary in order to understand the various aspects of the invention. In any event, the stator assembly 58 and rotor assembly 60 of the generator 18 cooperate to convert the mechanical energy received from the wind turbine rotor 16 into electrical energy so that the kinetic energy of the wind is harnessed for power generation. Specifically, the movement of the magnets of the rotor assembly 60 past the stationary coils of the stator assembly 58 induces an electrical current in the coils according to the precepts of Faraday's Law.

In the embodiment provided above, the rotor assembly 60 is described as being the field source (i.e., exciting component) of the generator 18 and the stator assembly 58 is described as being the current source (i.e., armature winding). In alternative embodiments, however, the rotor assembly 60 may comprise the current source and the stator assembly 58 may comprise the field source. Moreover, those skilled in the art will appreciate generator arrangements where the stator assembly 58 is disposed radially inward of the rotor assembly 60 rather than vice-versa. Thus, aspects of the invention are not limited to that shown and described herein.

As noted above, the bearing assemblies support the drive shaft 48 relative to the outer housing 34 of generator 18. In this regard, the bearing assemblies are configured to support the drive shaft 48 against axial thrust, radial displacement, and tilt such that for all intents and purposes, the drive shaft 48 is constrained to a single degree of freedom in its movement, i.e., rotations about central axis 50. Similar to conventional designs, to prevent or reduce the likelihood of the drive shaft 48 from becoming over-constrained by the outer housing 34, but yet support axial loading thereon, one of the bearing assemblies may be configured as a fixed bearing while the other bearing may be configured as a floating bearing. In an exemplary embodiment, the front bearing assembly may be configured as the fixed bearing and therefore designed to resist axial loading of the drive shaft 48, and the rear bearing assembly 54 may be configured as the floating bearing, therefore permitting a limited amount of axial displacement relative to the outer housing 34. This configuration, however, is merely exemplary and in an alternative embodiment, the front bearing assembly may be configured as the floating bearing and the rear bearing assembly 54 may be configured as the fixed bearing.

Figure 4:
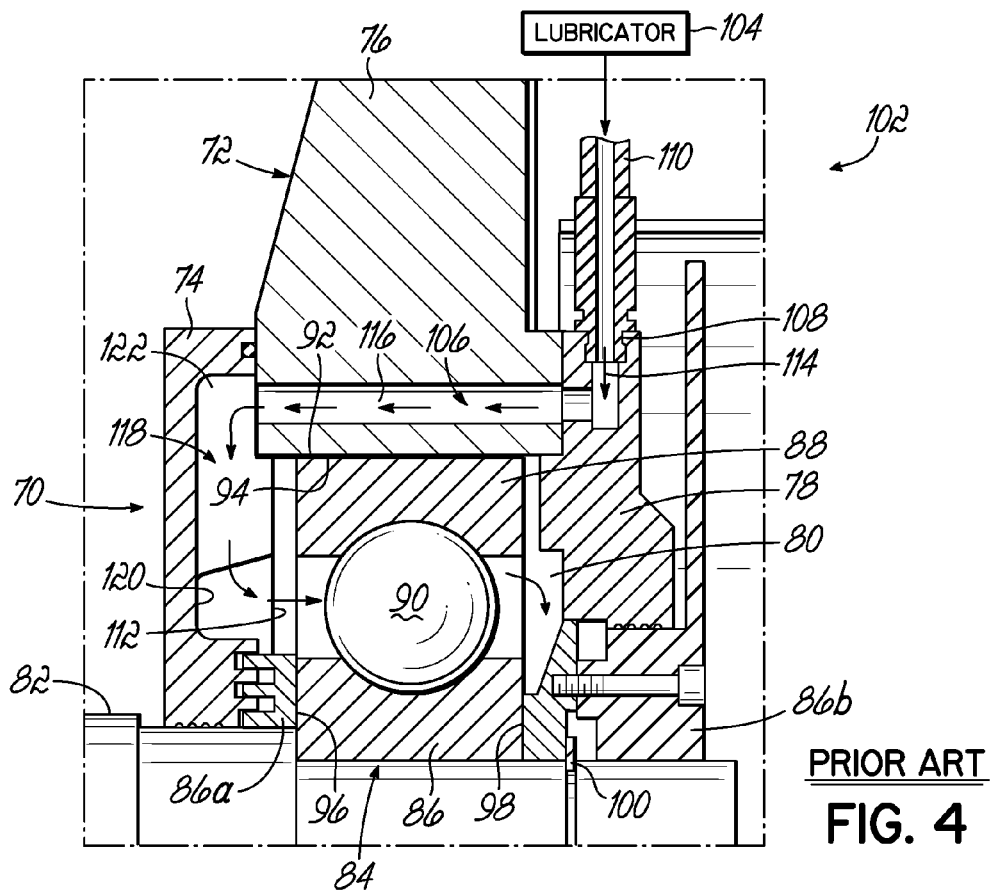
FIG. 4 is a partial cross-sectional view of a generator housing and bearing assembly according to the prior art.
Figure 5:
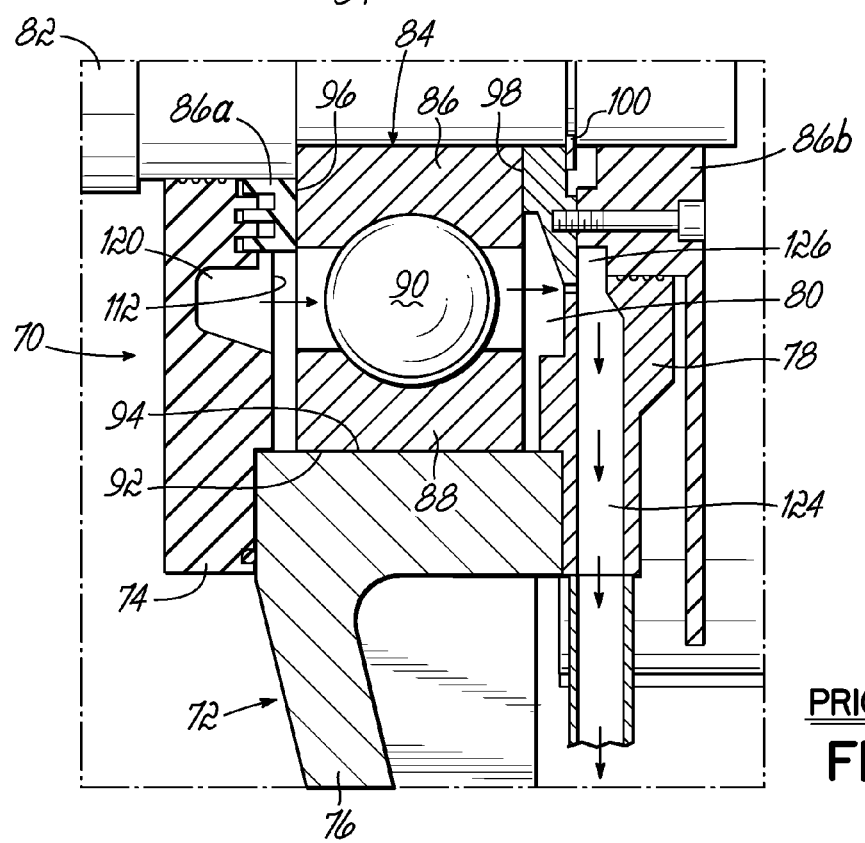
FIG. 5 is another partial cross-sectional view of a generator housing and bearing assembly according to the prior art.

Aspects of the invention are generally directed to improved lubrication of the floating bearing and the benefits gained thereby. Thus, the remainder of this description will primarily focus on these aspects. For example, the fixed bearing assembly (e.g., front bearing assembly in the exemplary embodiment) will not be described in any further detail, as one of ordinary skill in the art will understand its construction and operation. Nevertheless, to illustrate the various improved aspects in accordance with the invention, it may be instructive to understand the lubrication of the floating bearing in accordance with some current generator designs for wind turbines. In this regard, FIGS. 4 and 5 illustrate a lubrication system for a floating bearing as generally understood from the prior art.

In the arrangement shown in these figures and as noted above, the floating bearing assembly 70 of the prior art may be positioned adjacent the end shield 72 of the outer housing. In this regard, the end shield 72 may include an inner shield member 74, an intermediate shield member 76, and an outer shield member 78. The inner and outer shield members 74, 78 may be coupled to the intermediate shield member 76 via bolts or other suitable fasteners (not shown). Moreover, the intermediate shield member 76 may extend radially toward the side wall of the outer housing and be coupled to a flange extending therefrom via bolts or other suitable fasteners (e.g., similar to that shown in FIG. 3). Collectively, the end shield 72 defines a cavity 80 in which the floating bearing assembly 70 may be disposed.

The floating bearing assembly 70 includes a bearing 84 and fixation members 86a, 86b for securing the position of the bearing 84 relative to the drive shaft 82 and the outer housing, such as via the end shield 72. The bearing 84 may be configured as a rolling element bearing having an inner race 86, an outer race 88, and a plurality of rolling elements, such as ball bearings 90, disposed between the inner and outer races 86, 88. The inner race 86 is configured to be coupled to the drive shaft 82 during installation so that the inner race 86 rotates with rotation of the drive shaft 82. For example, this coupling may be achieved through a shrink fit or other suitable connection. Additionally, the outer race 88 fits snugly within cavity 80 through an interference fit between an outer surface 92 of the outer race 88 and the inner surface 94 of the end shield 72. Accordingly, the outer race 88 is configured to be rotationally stationary. As discussed above, and as will be discussed in more detail below, the region between the outer surface 92 of the outer race 88 and the inner surface 94 of the end shield 72 is a critical region for floating bearing designs.

The first fixation member 86a may be disposed on the inboard side of the bearing 84 and coupled to the drive shaft 82 so as to rotate therewith. The first fixation member 86a provides an abutment surface 96 against which the inner race 86 engages when assembled so as to fix the position of the bearing 84 on the drive shaft 82. Additionally, the second fixation member 86b may be disposed on the outboard side of the bearing 84 and similarly coupled to the drive shaft 82 so as to rotate therewith. The second fixation member 86b provides an abutment surface 98 which engages against the inner race 86 when assembled. The second fixation member 86b may be kept in place by a retaining ring or washer 100 coupled to the drive shaft 82. While the fixation members 86a, 86b secure the position of the inner race 86 relative to the drive shaft 82, the outer race 88 is not axially confined within the cavity 80, but is capable of a limited amount of axial displacement within cavity 80, as explained above. As shown in these figures, the gaps on the sides of the outer race 88 illustrate its capacity for a limited amount of axial movement relative to the end shield 72.

In further reference to FIGS. 4 and 5, current generator designs typically include two lubrication models or systems that provide for operation of the floating bearing assembly 70. The first lubrication system is directed to lubrication of the interior of the bearing, and more specifically, to the rolling elements themselves (i.e., ball bearings 90) relative to inner and outer races 86, 88. The second lubrication system is directed to lubrication in the region between the outer surface 92 of the outer race 88 and the inner surface 94 of the end shield 72. In current generator designs, these are treated as different systems. In this regard and in reference to FIG. 4, the first lubrication system 102 includes an external lubricator, shown schematically at 104, for supplying a lubricant to the floating bearing assembly 70. Such external lubricators are generally known in the wind turbine industry and thus will not be described any further herein.

The first lubrication system 102 further includes a lubrication flow path 106 through the outer housing, and more particularly, through the end shield 72. The flow path 106 provides an inlet 108 which is accessible from an external side of the outer housing and which is in fluid communication with the lubricator 104, such as via a suitable conduit or hose 110. The flow path 106 is arranged such that lubricant flowing therethrough is delivered to an outlet 112 on the internal side of the outer housing which is in fluid communication with the inboard side of the bearing 84 and the interior of the bearing 84. As illustrated in FIG. 4, the flow path 106 includes a first bore portion 114 in the outer shield member 78 which includes inlet 108 at a first end thereof. The intermediate shield member 74 includes a second bore portion 116 in fluid communication with the first bore portion 114 at one end thereof and which extends through the intermediate shield member 76. The inner shield member 74 includes a lubrication cavity 118 having a circumferentially continuous annular portion 120 and a channel portion 122 which extends generally radially from the annular portion 120 so as to be in fluid communication with the second bore portion 116. The annular portion 120 of the lubrication cavity 118 operates as a distribution manifold for supplying lubricant more uniformly to the inboard side of the bearing 84 and is open to the inboard side of the bearing 84. This opening operates as the outlet 112 of the lubricant flow path 106.

In use, and as illustrated by the arrows in FIG. 4, lubricant from the lubricator 104 is pumped through conduit 110 and through inlet 108 of the flow path 106. The lubricant flows through the first bore portion 114 in the outer shield member 78, through the second bore portion 116 in the intermediate shield member 76, and into the channel portion 122 of the lubrication cavity 118. The lubricant then flows to the annular portion 120 which distributes the lubricant to the inboard side of the bearing 84 through outlet 112. From here, the lubricant flows from the inboard side of the bearing 84, through the interior of the bearing 84, such as through the spaces between adjacent ball bearings 90, and to the outboard side of the bearing 84. To allow a flow of fresh lubricant through the bearing 84, the used, decomposed, or otherwise spent lubricant on the outboard side of the bearing 84 must be removed. In this regard, and as illustrated in FIG. 5, the generator generally includes a drain 124 in the end shield 72, and more particularly, in the outer shield member 78. The drain 124 has an inlet 126 in fluid communication with the outboard side of the bearing 84 and an outlet 128 in fluid communication with a holding tank or reservoir 130 for holding spent lubricant, similar to that shown in FIG. 2. The first lubrication system 102, as described above, is generally successful for supplying lubricant to the interior of the bearing 84 in order to provide good performance and longevity.

Figure 6:
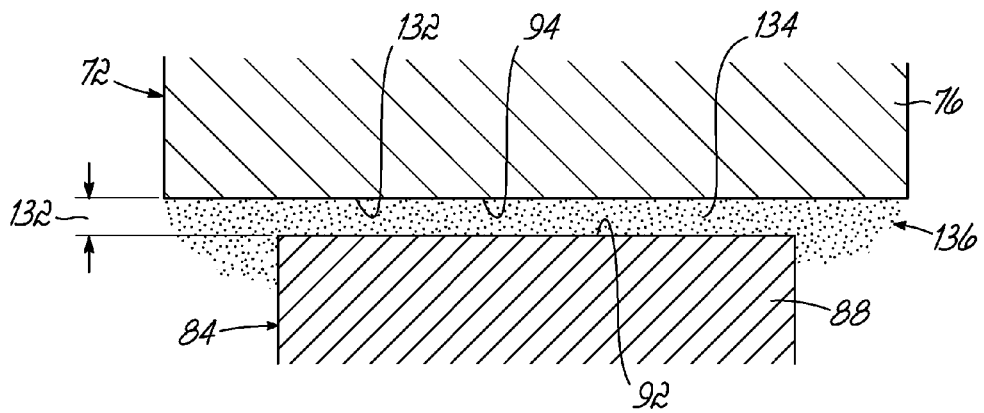
FIG. 6 is an enlarged partial cross-sectional view of the housing and bearing assembly shown in FIG. 4.

In floating bearings, however, there is another area that requires sufficient lubricant in order to provide proper operation of the bearing. More particularly, as discussed above the floating bearing assembly 70 is designed to provide a limited amount of axial displacement during use. Thus, as shown in FIG. 6, the region 132 between the outer surface 92 of the outer race 88 and the inner surface 94 of the end shield 72 should include a lubricant to facilitate relative movement therebetween. For purposes of this description, the lubrication layer 134 in the region 132 will be referred to as the second lubrication system 136. Unlike the first lubrication system 102, short of a rebuild of the bearing assembly 70, there is no mechanism or provision that allows the lubrication layer 134 to be replenished during operation of the generator. Instead, the lubrication layer 134 is initially established during assembly of the generator, such as by placing a sufficient amount of lubricant on the outer surface 92 of outer race 88 and/or the inner surface 94 of the end shield 72 prior to locating the bearing assembly 70 and end shield 72 in their assembled position.

As discussed above, during use, the lubrication layer 134 of the second lubrication system 136 may decompose, weep out of the space (such as on the outboard side of the bearing), get scraped off the bearing surfaces, etc. As there is no provision for replenishing the lubricant in the region 132, the lubrication layer 134 may diminish and therefore become less effective at facilitating relative axial movement between the bearing 84 and the end shield 72. In some situations, the lack of sufficient lubricant in the region 132 between the outer race 88 and the end shield 72 may allow the bearing 84 to become jammed or cocked in such a way that axial movement of the bearing 84 is restricted. If that should happen, the drive shaft 82 may become over-constrained, due to, for example, thermal expansions/contractions among other possible reasons, such that one or both of the generator bearing assemblies fails.

Figure 7:
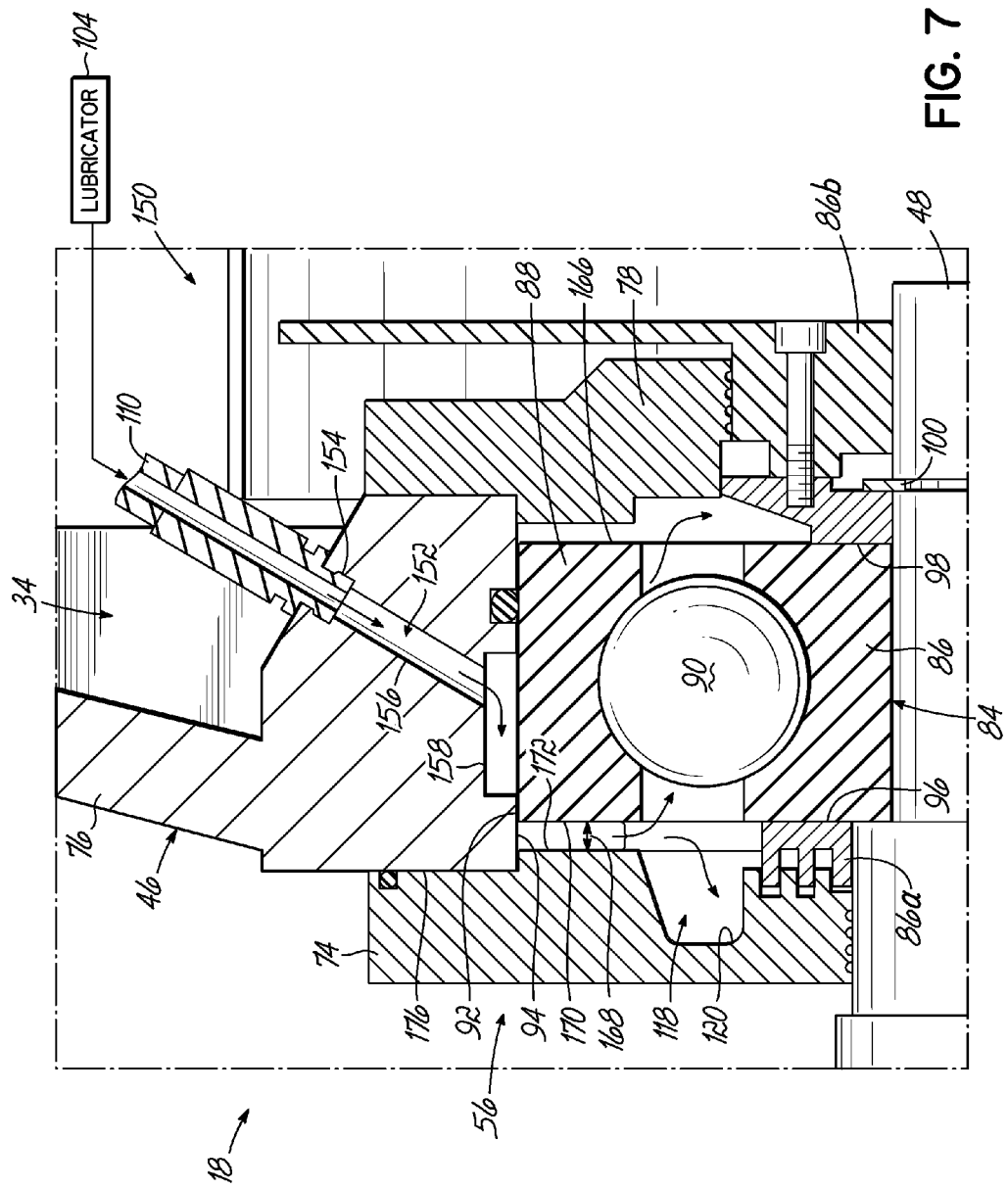
FIG. 7 is a partial cross-sectional view of a generator housing and bearing assembly in accordance with an embodiment of the invention.

The generator 18 illustrated in FIGS. 2 and 3, and shown in more detail in FIG. 7, addresses this shortcoming in the lubrication system of current generator designs. In this regard, the lubrication system for generator 18 is configured such that the lubrication layer in the region between the outer surface of the outer race (referred to as the bearing surface) and the inner surface of the end shield (referred to as the support surface) may be replenished with new lubricant during operation of the generator. No longer are there two separate lubrication systems for supplying lubricant to the floating bearing, as in the prior art. Instead, one lubrication system is used to supply lubricant to the interior of the bearing and to supply lubricant to the region between the bearing and the end shield. In an exemplary embodiment, this is achieved by reconfiguring the lubrication flow path that extends from an inlet accessible from the external side of the generator outer housing to an outlet internal to the generator and in fluid communication with the interior of the bearing. More particularly, the flow path is reconfigured such that at least a portion of the region between the bearing and the end shield forms part of the flow path that supplies lubricant to the bearing interior.

Figure 8:
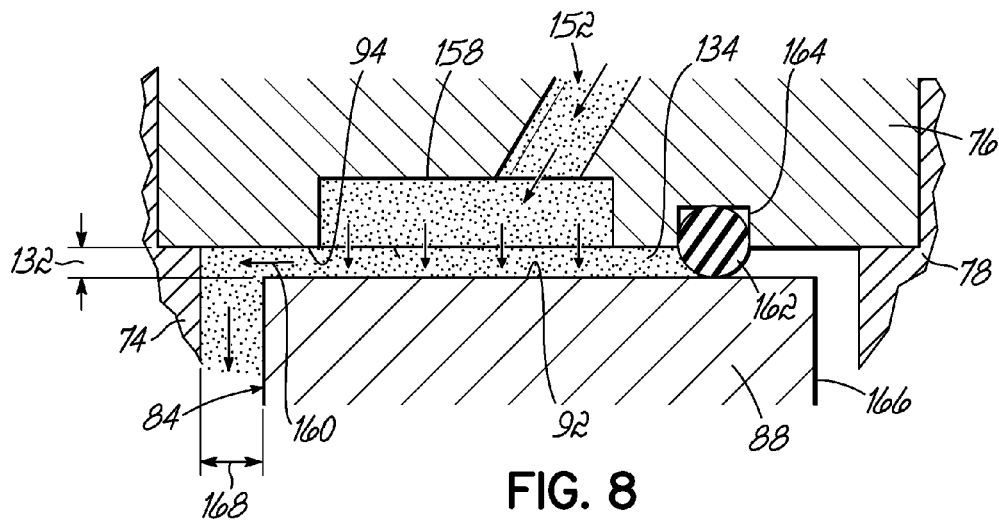
FIG. 8 is an enlarged partial cross-sectional view of the housing and bearing assembly shown in FIG. 7.

As shown in FIGS. 7 and 8, in which like reference numerals refer to like features from FIGS. 4-6, generator 18 includes a lubrication system 150 including external lubricator 104 for supplying lubricant to the floating bearing assembly 56 and a lubrication flow path 152 through the outer housing 34, and more particularly, through the end shield 46. The lubricant supplied to the bearing 84 may be a suitable grease, oil, or other liquid, solid, or semi-solid that provides a lubricating effect to the bearing. The flow path 152 provides an inlet 154 which is accessible from an external side of the outer housing 34 and which is in fluid communication with the lubricator 104, such as via conduit 110. As noted above, the flow path 152 is arranged to not only supply lubricant flowing therethrough to the bearing interior, such as from the inboard side of the bearing 84, but is also arranged such that the region 132 between the outer surface 92 of the outer race 88 (i.e., the bearing surface) and the inner surface 94 of the end shield 46 (i.e., the support surface) forms part of the flow path 152. Such an arrangement is shown in greater detail, for example, in FIG. 8.

As illustrated in FIGS. 7 and 8, the flow path 152 includes a first bore portion 156 in the end shield 46 which includes inlet 154 at the exterior of the end shield 46. In one embodiment, the first bore portion 156 may be completely in the intermediate shield member 76. Such a configuration is merely exemplary, however, and the first bore portion 156 (or additional bore portions) may also extend from or into the outer shield member 78. The flow path 152 further includes an annular groove 158 formed on the inner surface 94 of the end shield 46 which confronts the outer surface 92 of the outer race 88. The annular groove 158 is in fluid communication with the first bore portion 156 such that lubricant flowing through the first bore portion 156 may be distributed over the periphery or circumference of the outer race 88, and more specifically, the outer surface 92 thereof. The annular groove 158 may have a wide variety of configurations including a generally rectangular configuration having various lengths and depths. Other geometries and dimensions are also possible and may depend on the particular application. In accordance with the invention, the flow path 152 further includes the annular gap 160 between the outer surface 92 of the outer race 88 and the inner surface 94 of the end shield 46. This annular gap 160 may include part of or the entirety of the region 132. Accordingly, for lubricant to flow to the inboard side of the bearing 84 and eventually reach the bearing interior, the lubricant must flow through at least a portion of the region 132.

To urge the lubricant flowing from the groove 158 and into the annular gap 160 towards the inboard side of the bearing 84, and not to the outboard side of the bearing 84 (thereby bypassing the ball bearings 90), a seal member 162 may be disposed adjacent the outboard side of the bearing 84. In an exemplary embodiment, the seal member 162 may be configured as an O-ring. In this regard, the inner surface 94 of the end shield 46 may include a seal groove 164 generally disposed on the outboard side of the groove 158 and configured to receive the O-ring therein. When the generator is assembled, the O-ring seated in seal groove 164 forms a substantially fluid tight seal with the outer surface 92 of the outer race 88 adjacent its outboard side surface 166. In this way, lubricant flowing from groove 158 is directed toward the inboard side of the bearing 84 and through the annular gap 160. By directing the lubricant through the annular gap 160, the lubrication layer 134 in the region 132 may be replenished and maintained, thereby avoiding the deficiencies in current generator designs.

Once lubricant passes through the annular gap 160, multiple pathways may exist for the lubricant to reach the bearing interior via the inboard side of the bearing 84 depending on, for example, the axial position of the bearing 84 within cavity 80. In this regard, in the normal course, a gap 168 may exist between the inboard side surface 170 of the outer race 88 and the outboard side surface 172 of the inner shield member 74. In this case, the lubricant may flow from the annular gap 160 into gap 168 and to the inboard side of the bearing 84. However, should the bearing 84 be axially positioned such that the inboard side surface 170 of the outer race 88 abuts the outboard side surface 172 of the inner shield member 74, thereby closing off gap 168, then lubricant may flow to the inboard side of the bearing 84 via the channel and annular portions 122, 120 of lubrication cavity 118 in the inner shield member 74 similar to that shown in FIG. 4 (the channel 122 is not shown in FIG. 7). In either case, the lubricant is able to flow to the inboard side of the bearing 84 from the annular gap 160. The lubricant on the inboard side of the bearing 84 then passes through the interior of the bearing 84 and is removed through drain 124 similar to that described above.

Figure 9:
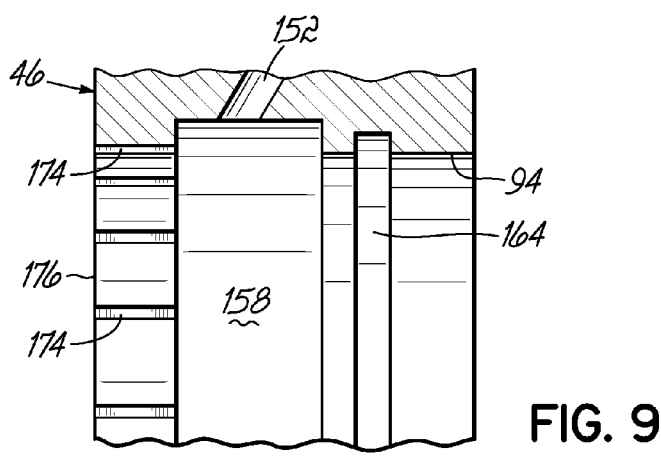
FIG. 9 is a partial cross-sectional view of a support surface of the generator housing in accordance with an embodiment of the invention.

In one embodiment, all the lubricant flowing from groove 158 is forced to flow through the annular gap 160 in order to reach the inboard side of the bearing 84 and the bearing interior. In some applications, the relatively narrow flow path along annular gap 160 may undesirably reduce the flow rate of lubricant to the inboard side of the bearing 84. Additionally or alternatively, in some applications, the pressures required to drive all the lubricant through the annular gap 160 may be undesirably large. To address this situation, in an alternative embodiment and as illustrated in FIG. 9, the lubrication flow path 152 may additionally include one of more flow channels 174 extending from the groove 158 toward the inboard side surface 176 of the intermediate shield member 76 and being open to the inner surface 94. In one embodiment, the flow channels 174 may extend to the inboard side surface 176. Lubricant in the flow channels 174 may then flow to the inboard side of the bearing through the gap 168, for example. In the event the outer race 88 abuts the inner shield member 74, closing off gap 168, at least one of the flow channels 174 may be open to the lubrication cavity 118 in the inner shield member 74 so the lubricant may reach the inboard side of the bearing 84. It is important to note that while the flow path 152 may include these flow channels 174, they are configured such that lubricant still flows through the annular gap 160 so as to replenish the lubrication layer 134 in region 132. The flow channels 174 may have a wide variety of configurations. For example, in one embodiment the flow channels 174 may be axially-directed channels, as shown in FIG. 9. In an alternative embodiment, the flow channels 174 may be angled relative to the axial direction In still a further embodiment, the flow channel 174 may have a helical configuration or other configuration that provides a flow path from the groove 158 to the inboard side of the bearing 84 in addition to that provided by annular gap 160.

In addition to maintaining or replenishing the lubrication layer 134 at region 132, the lubrication flow path 152 in accordance with the invention may provide additional benefits. In this regard, the flow path 152 may increase or promote heat transfer between the bearing 84 and the end shield 46. Accordingly, temperature differences between the bearing 84 and outer housing 34 may be reduced, thereby reducing the thermal expansions/contractions which may contribute to binding of the floating bearing assembly 54. Additionally, the thin film of lubricant established between the bearing 84 and the end shield 46 may also promote vibration damping between the moving and stationary parts of the generator 18. This feature would be similar to that provided by squeeze film dampers.

Another benefit afforded by the present invention is that it may be implemented in current generator designs relatively easily. In this regard, the current rolling element lubrication system (e.g., the first lubrication system 152 described above) may be utilized such that no additional lubrication equipment is required. The primary change to the generator 18 is a re-design of the end shield on the end of the generator 18 having the floating bearing assembly. The floating bearing assembly itself does not require any modifications to implement aspects of the invention. Accordingly, a retrofit kit could be offered for current generator designs, which includes a new end shield with the features as described above.

While the present invention has been illustrated by a description of various preferred embodiments and while these embodiments have been described in some detail, it is not the intention of the inventor to restrict or in any way limit the scope of the appended claims to such detail. Additional advantages and modifications will readily appear to those skilled in the art. For example, while the above was directed to floating bearing assemblies, aspects of the invention may be used in other bearing designs including, for example, fixed bearings. Thus, the various features of the invention may be used alone or in any combination depending on the needs and preferences of the user.

What is claimed is:

1. A rotating electrical machine, comprising:
an outer housing;
a drive shaft rotatably mounted within the outer housing;
a bearing supporting the drive shaft relative to the outer housing, wherein the outer housing includes a support surface confronting the bearing and the bearing includes a bearing surface confronting the support surface, and further wherein a region defined between the support surface and the bearing surface has a lubrication layer; and
a lubrication flow path configured to direct a lubricant to the bearing, wherein the lubrication flow path is in fluid communication with the region between the support surface and the bearing surface so as to replenish the lubrication layer,
wherein the bearing forms part of a floating bearing assembly wherein at least a portion of the bearing that includes the bearing surface is permitted to be axially displaced relative to the outer housing.

2. The rotating electrical machine according to claim 1, wherein the lubrication flow path includes an inlet for receiving lubricant and an outlet for supplying lubricant to an interior of the bearing, at least a portion of the region between the support surface and the bearing surface forming a portion of the lubrication flow path between the inlet and the outlet.

3. The rotating electrical machine according claim 1, wherein the lubrication flow path includes an annular groove formed in the support surface, the groove configured to distribute lubricant about a periphery of the bearing surface.

4. The rotating electrical machine according to claim 3, wherein the lubrication flow path further includes one or more flow channels formed in the support surface, the one or more flow channels in fluid communication with the groove and extending away therefrom.

5. The rotating electrical machine according to claim 1 further comprising a seal member disposed in the region between the support surface and the bearing surface for urging lubricant in a preferred direction.

6. The rotating electrical machine according to claim 5, wherein the outer housing includes an annular seal groove formed in the support surface and the seal member includes an O-ring seated in the seal groove and configured to form a fluid tight seal with the bearing surface.

7. The rotating electrical machine according to claim 1, wherein the bearing is configured as a rolling element bearing having an inner race, an outer race, and a plurality of rolling elements disposed therebetween, an outer surface of the outer race defining the bearing surface.

8. The rotating electrical machine according to claim 1, wherein the outer housing includes an end shield, the end shield substantially surrounding the bearing and defining the support surface.

9. The rotating electrical machine according to claim 1, wherein the rotating electrical machine is configured as a generator having a stator assembly and a rotor assembly positioned within the outer housing and configured to produce electricity.

10. A wind turbine, comprising:
a tower;
a nacelle disposed adjacent a top of the tower;
a rotor including a hub and at least one wind turbine blade extending from the hub; and
a generator disposed in the nacelle, the generator having a stator assembly and a rotor assembly positioned within the outer housing and configured to produce electricity and further including:
an outer housing;
a drive shaft rotatably mounted within the outer housing;
a bearing supporting the drive shaft relative to the outer housing, wherein the outer housing includes a support surface confronting the bearing and the bearing includes a bearing surface confronting the support surface, and further wherein a region defined between the support surface and the bearing surface has a lubrication layer; and
a lubrication flow path configured to direct a lubricant to the bearing, wherein the lubrication flow path is in fluid communication with the region between the support surface and the bearing surface so as to replenish the lubrication layer.

11. A method of lubricating a bearing for a rotating electrical machine that supports a drive shaft relative to an outer housing, the outer housing including a support surface confronting the bearing and the bearing including a bearing surface confronting the support surface, and a region being defined between the support surface and the bearing surface, the method comprising:
operating the rotating electrical machine; and
supplying lubricant to the region between the support surface and the bearing surface during operation of the rotating electrical machine so as to replenish a lubrication layer disposed in the region,
wherein the bearing forms part of a floating bearing assembly wherein at least a portion of the bearing that includes the bearing surface is permitted to be axially displaced relative to the outer housing.

12. The method according to claim 11, further comprising supplying lubricant to an interior of the bearing.

13. The method according to claim 12, wherein supplying lubricant to the region between the support surface and the bearing surface and supplying lubricant to the interior of the bearing further comprises directing lubricant along a flow path in fluid communication with the interior of the bearing, wherein at least a portion of the flow path includes the region between the support surface and the bearing surface.

14. The method according to claim 11, wherein supplying lubricant to the region between the support surface and the bearing surface further comprises distributing the lubricant about the periphery of the bearing.

15. The method according to claim 12, wherein the rotating electrical machine includes a lubrication system for supplying lubricant, wherein supplying lubricant to the region between the support surface and the bearing surface and supplying lubricant to the interior of the bearing are performed by the same lubrication system.

16. The method according to claim 12, further comprising:
passing lubricant through the interior of the bearing; and
draining the used lubricant from the rotating electrical machine.

17. The method according to claim 11, wherein the rotating electrical machine is configured as a generator.

18. A method according to claim 17, wherein the generator is for use in a wind turbine.

* * * * *